(12) United States Patent
Jauss et al.

(10) Patent No.: US 8,534,266 B2
(45) Date of Patent: Sep. 17, 2013

(54) OIL SEPARATOR FOR GAS-POWERED COMBUSTION ENGINES

(75) Inventors: Andreas Jauss, Westernohe (DE); Ingo Zumbroich, Gross-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 834 days.

(21) Appl. No.: 12/375,919

(22) PCT Filed: Jul. 27, 2007

(86) PCT No.: PCT/EP2007/006679
§ 371 (c)(1),
(2), (4) Date: Sep. 2, 2009

(87) PCT Pub. No.: WO2008/014939
PCT Pub. Date: Feb. 7, 2008

(65) Prior Publication Data
US 2010/0012097 A1    Jan. 21, 2010

(30) Foreign Application Priority Data

Aug. 1, 2006  (EP) .................................... 06015968

(51) Int. Cl.
*F02M 33/02*  (2006.01)

(52) U.S. Cl.
USPC ........................................................ 123/518

(58) Field of Classification Search
USPC ............... 96/108, 132, 134, 333; 123/198 D, 123/518, 519, 520, 521, 196 A, 527, 529
See application file for complete search history.

(56) References Cited

U.S. PATENT DOCUMENTS

| 3,577,726 A * | 5/1971 | Wagner ........................ 60/605.1 |
| 4,690,759 A | 9/1987 | Mandy |
| 6,951,210 B2 * | 10/2005 | Landi et al. .................... 123/525 |
| 2006/0032486 A1 * | 2/2006 | Prasad .......................... 123/572 |
| 2010/0294250 A1 | 11/2010 | Jauss |

FOREIGN PATENT DOCUMENTS

| DE | 102006036116 A1 | 2/2008 |
| FR | 2566844 A1 | 1/1986 |
| GB | 2376193 A | 12/2002 |
| JP | 9228897 A | 9/1997 |
| JP | 2000205050 A | 7/2000 |

* cited by examiner

*Primary Examiner* — Stephen K Cronin
*Assistant Examiner* — Sizo Vilakazi
(74) *Attorney, Agent, or Firm* — Ingrassia Fisher & Lorenz, P.C.

(57) ABSTRACT

An oil separator is provided to deposit gas fuel contained in the oil components for connection to a gas fuel line to a gas-powered combustion engine, which is a housing with an inlet opening and an outlet opening for gas fuel, one recorded in the cabinet, which gas fuel then is flowable through the filter element, the sealing between a with the airflow associated stream dream and a receipt with the airflow associated outlet opening starting area is, and one in the inlet opening in the direction of gravity below an outlet with the airflow associated oil collection tank to record in the entrance area by gravity separation from the remote oil gas fuel includes. Furthermore, the oil separator a second oil collection tank to record from the filter element expiring contain oil.

5 Claims, 1 Drawing Sheet

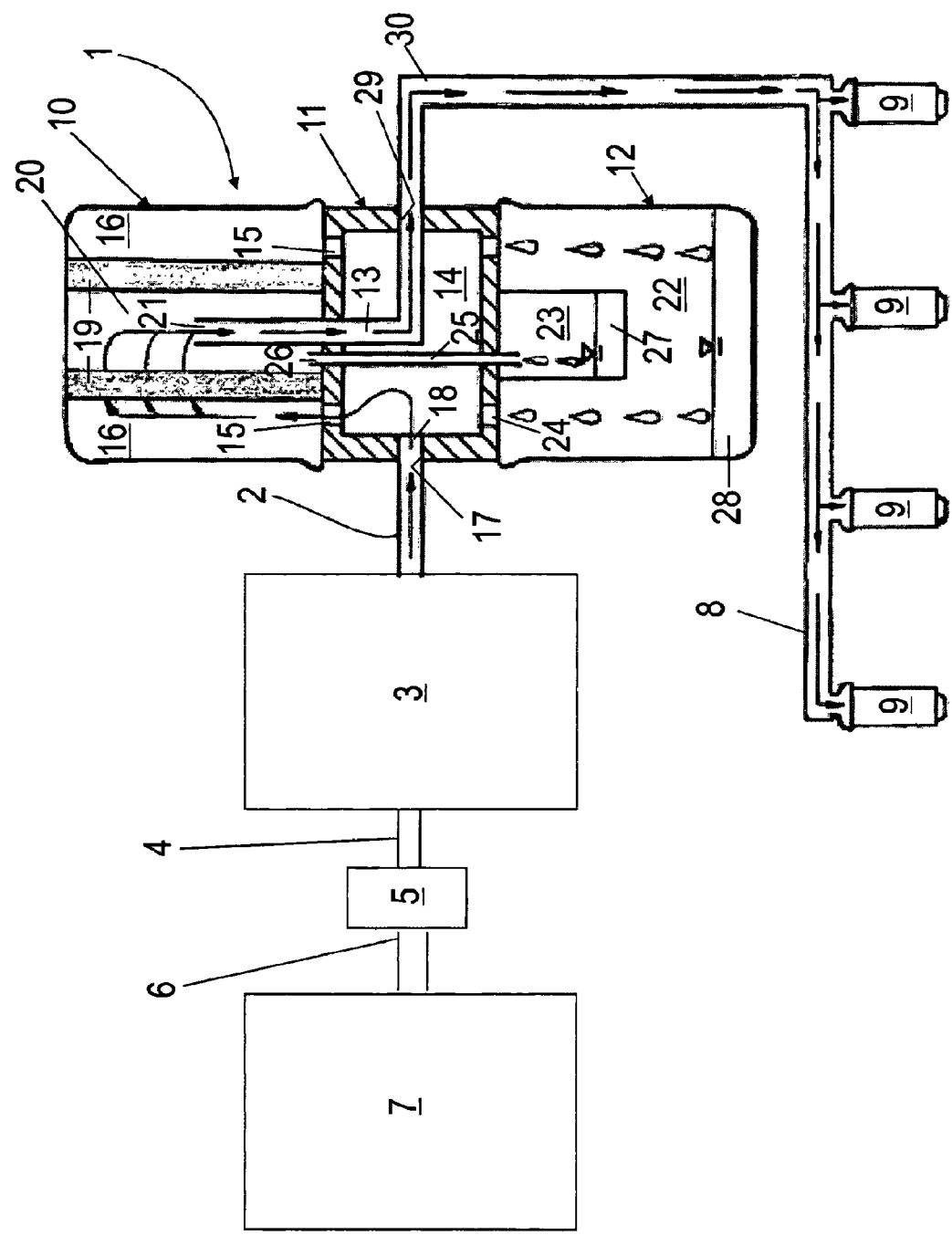

OIL SEPARATOR FOR GAS-POWERED COMBUSTION ENGINES

CROSS-REFERENCE TO RELATED APPLICATIONS

This application is a U.S. National-Stage entry under 35 U.S.C. §371 based on International Application No. PCT/EP2007/006679, filed Jul. 27, 2007, which was published under PCT Article 21(2) and claims priority to European Application No. 06015968.8, filed Aug. 1, 2006, which are all hereby incorporated in their entirety by reference.

TECHNICAL FIELD

The present invention lies in the area of automotive engineering, and relates to an oil separator for gas-powered combustion engines.

BACKGROUND

Gas-powered motor vehicles are today operated primarily using so-called liquefied gases and natural gases. Liquefied gases, such as auto gas (LPG=liquefied petroleum gas), which arise as a byproduct of hydrogenating processes in petroleum refining, are usually based on petroleum, and essentially consist of propane and butane. Natural gas (CNG=compressed natural gas) is mainly methane, and is obtained from extraction from natural gas sources.

In motor vehicles operated with natural gas, storing a higher quantity of fuel requires that the gas fuel in the gas tank be compressed under a high pressure, for example measuring 200-300 bar. For combustion engine operation, the compressed gas fuel must then again be relieved to a suitable low gas pressure, which most often lies below 10 bar, for example measuring approx. 8 bar. The gas fuel is relieved in a pressure reducer hooked up to the gas fuel line, from which the relieved gas stream is routed to respective fuel injection valves ("fuel injectors") for injection into the intake tract of the combustion engine.

While filling up the motor vehicle at the gas station, practice has shown that the gas fuel compressed to a high gas pressure is often contaminated with the lubricating oil of the compressor used for filling up the tank. This is caused by the increasingly shorter times between consecutive refueling stops owing to the continually growing number of gas-powered motor vehicles. As a result, the operating temperature in the high-pressure stages of the compressor can rise so severely that lubricating oil evaporates and gets into the gas tank of the motor vehicle in gaseous form or as an aerosol with the gas fuel.

If the gas fuel in the pressure reducer is relieved to a gas pressure of 8 bar, for example, the gas fuel cools as pressure is relieved, so that the entrained oil constituents condense and are present in the gas fuel in liquid form or as an aerosol. The flow dynamics cause the oil contained in the gas fuel to become distributed unevenly to the fuel injectors, which can give rise to varying flow characteristics in the fuel injection valves and problems in exhaust gas treatment. As a result, it may not be possible to observe exhaust gas provisions over the route traveled, and drivability problems may be encountered. In addition, there is a danger that vehicle components, such as catalytic converters, might be damaged. The fuel injectors have also been observed to bond or gum to the oil constituents contained in the gas fuel.

In order to avoid these problems, it is known for vehicles to incorporate an oil separator in the gas fuel line between the gas tank and fuel injectors. Such an oil separator is normally installed on the low pressure side of the pressure reducer, the advantage to which his that the oil separator need only be pressure resistant to low pressure, and that the oil condensed on the low pressure side of the pressure reducer is easier to separate in liquid form or as an aerosol.

Oil separators used to date are designed in such a way that the gas fuel passes through a fleece filter so as to separate out the oil constituents contained in the fuel. However, a fleece filter essentially only makes it possible to trap the oil constituents present in the form of an aerosol in the gas fuel. If the gas fuel contains a larger quantity of liquid oil, this normally leads to the rapid saturation of the fleece filter, and decreases the filter effectiveness. The gas flow allows the oil contained in the fleece filter to "power through" to the clean gas side, the disadvantageous consequence of which is that the gas fuel becomes contaminated again.

By contrast, at least one object of the present invention is to provide an oil separator with which oil constituents can be reliably and safely removed from the gas fuel. In addition, other objects, desirable features, and characteristics will become apparent from the subsequent summary and/or detailed description, and the appended claims, taken in conjunction with the accompanying drawings and this background.

SUMMARY

An embodiment of the invention shows an oil separator for purposes of separating out oil constituents contained in gas fuel, which is intended and suitable for connection to a gas fuel line of a combustion engine powered by gas fuel, in particular for driving a motor vehicle.

The oil separator encompasses a casing with an inlet opening for gas fuel (contaminated with oil constituents) and an outlet opening for cleaned gas fuel, and a filter element incorporated in the casing, for example a fleece filter, to filter the gas fuel, through which gas fuel can flow. The filter element forms a seal between a fluid-carrying entry area connected with the inlet opening in terms of flow and a fluid-carrying exit area connected with the outlet opening in terms of flow. Therefore, the entry and exit areas are only connected with each other in terms of flow by way of the filter element, and otherwise sealed fluid tight relative to each other, so that a stream of gas fuel coming toward the filter element under an excess pressure must pass the filter element without any ability of circumvention in order to get from the entry area on the inflow side into the exit area on the outflow side. The inlet opening empties into the entry area, so that gas fuel (contaminated by oil constituents) can be routed to the filter element. To this end, the inlet opening is connected to a gas fuel line of the combustion engine arrangement. The cleaned gas fuel in the exit area is discharged form the oil separator via the outlet opening.

In addition, the oil separator according to an embodiment of the invention encompasses a first oil collection tank, which is set up in the entry area in the gravitational direction under a port connected in terms of flow with the inlet opening for discharging gas fuel into the entry area, and serves to hold oil separated from the gas fuel in the entry area through gravitational separation. Hence, the first oil collection tank is arranged in such a way that it can collect oil constituents of the gas fuel separated out via gravitational separation. In order to facilitate gravitational separation, the gas fuel flowing into the entry area through the inlet opening is advantageously diverted in such a way as to increase a vector component of the (vector) gas stream directed against the gravitational direction.

Therefore, oil constituents that can be separated via gravitational separation can be advantageously separated out of the flowing gas fuel in the entry area, and collected in an oil collection tank even before the gas fuel reaches the filter element. The entry area acts as an "oil trap" for the oil constituents contained in the gas fuel.

In an advantageous embodiment of the oil separator according to the invention, the latter further encompasses a second oil collection tank that is situated in the exit area in the gravitational direction under a port connected in terms of flow with the outlet opening, and used to collect oil coming from the filter element in the exit area. The second oil collection tank can hence be advantageously used to collect oil exiting the filter element, should the latter no longer be able to trap the oil filtered from the fuel. The fuel can be prevented from becoming contaminated again. The second oil collection tank can be accommodated in particular inside the first oil collection tank.

In another advantageous embodiment of the oil separator according to the invention, the latter is modular. In this embodiment, the oil separator encompasses a filter module containing the filter element, a terminal module containing the inlet and outlet opening, and an oil collection module containing the two oil collection tanks, and the filter module and the oil collection module are each detachably secured to the terminal module. In such a modular design for the oils separator, the latter can be assembled in a motor vehicle in an especially simple manner. All that needs to be done for this purpose is to mount the terminal module to the motor vehicle, hook it up to a gas fuel line of the combustion engine, and then secure the filter module and oil collection module to the terminal module. In addition, it is especially easy to perform maintenance on the oil separator based on a prescribed service schedule, since the filter module and/or the oil collection module can be removed and reassembled given a mounted terminal module, for example to change out the filter element or empty the oil collection tanks.

The invention further extends to a combustion engine arrangement, in particular for powering a motor vehicle, which encompasses a combustion engine that can be powered by gas fuel, a pressure reducer for decreasing the gas pressure of the gas fuel routed to the combustion engine, which is connected in terms of flow on the high-pressure side by a gas fuel line with at least one gas tank to store gas fuel, and on the low-pressure side by a gas fuel line with at least one controllable fuel injection valve for regulating the gas flow of the gas fuel routed to the combustion engine, as well as an oil separator of the kind described above, wherein the oil separator is advantageously connected to the low-pressure side gas fuel line.

In addition, the embodiments of the invention extend to a motor vehicle with a combustion engine arrangement of the kind described above.

BRIEF DESCRIPTION OF THE DRAWINGS

The present invention will hereinafter be described in conjunction with the following drawing figures, wherein like numerals denote like elements, and FIG. 1 is a diagrammatic view depicting the setup of an exemplary embodiment of the oil separator according to the invention in a combustion engine arrangement (e.g., of a motor vehicle).

DETAILED DESCRIPTION

The following detailed description is merely exemplary in nature and is not intended to limit application and uses. Furthermore, there is no intention to be bound by any theory presented in the preceding background or summary or the following detailed description.

According to the above, a combustion engine arrangement, preferably one built into a motor vehicle, encompasses an oil separator according to the invention marked 1 overall in the diagrammatic view shown on FIG. 1, which is connected with the low-pressure side outlet of a pressure reducer 3 in terms of flow at the inlet by a gas fuel line 2.

The pressure reducer 3 can be a multi-stage pressure reducer, for example, which exhibits a plurality of pressure chambers interconnected via respective membrane pressure regulating valve (e.g., an inlet-side high-pressure chamber, an outlet-side low-pressure chamber and an intermediate pressure chamber lying in between), in which a high, low and intermediate gas pressure arises, controlled by the membrane pressure regulating valves. However, such a pressure reducer can also exhibit another number of pressure stages. Since the expert is aware of the structural design of such pressure reducers, no further explanation is required here.

The pressure reducer 3 is connected on its high-pressure side by a gas fuel line 4 to a high-pressure shutoff valve 5, which can block the gas fuel stream routed to the pressure reducer 3. The high-pressure shutoff valve 5 can be designed as a primary valve with integrated pilot valve, for example, and the pilot valve is designed in such a way that it can be electromagnetically controlled via the electrical power made available by the electrical system, for example of a motor vehicle. To this end, an opening surface of the primary valve is much larger than one for the pilot valve, so that a correspondingly larger mass stream of gas can be transported via the open primary valve than via the open pilot valve. As a result, less force is required to open the pilot valve than to open the primary valve. Since the expert is aware of the structural design of such high-pressure shutoff valves, no further explanation is required here.

The high-pressure shutoff valve 5 is connected with a gas tank 7 at the inlet side by a gas fuel line 6. The gas tank is usually provided with a separate shutoff valve, from which the gas fuel line 6 connected at the inlet with the high-pressure shutoff valve 5 branches.

The oil separator 1 is connected at the outlet side to a gas fuel line 30, which empties into a gas fuel rail 8 generally referred to as "rail". Arranged at the end of the gas fuel rail 8 is a plurality (e.g., four on FIG. 1) of controllable fuel injectors 9 (fuel injection valves), through which gas fuel can be injected into the intake tract of a combustion engine, which is not shown in greater detail on FIG. 1. The number of fuel injectors depends on the number of cylinders in the combustion engine, and it is here noted just for the sake of completeness that the number of fuel injectors is not limited to the number 4, but rather depends on the special configuration of the combustion engine.

The oil separator 1 shown on FIG. 1 is modular. It has a filter module 10, a terminal module 11 and an oil collection module 12. In this case, the filter module 10 and the oil collection module 12 are each detachably secured to the terminal module 11, for example via respective threaded joints. The three modules thereby comprise the oil separator 1. Let it be noted just for the sake of completeness that the modules can also be interconnected using other attachment types, for example, spring-loaded snap or latching seals.

The terminal module 11 is connected to the gas fuel line 2 by an inlet opening 17 that opens its lateral casing wall. The port 18 for the inlet opening 17 empties into a cavity 14 formed by the terminal module 11. The cavity 14 is with a cavity 16 formed by the filter module 10 so as to carry a liquid by the holes 15 formed in the casing wall of the terminal module 11. The filter module 10 accommodates a hollow cylindrical filter element 19 that separates the cavity 16 on the outside of the filter element 19 from a cavity 20 inside the filter element 19.

A connecting pipe 13 extends into the cavity 20, and its one end forms a port 21 to receive cleaned gas fuel, and its other end is joined with an outlet opening 29 that passes through the wall of the terminal module 11, and is in turn connected to the gas fuel line 30 (shown as a continuous line on FIG. 1).

The casing of the oil collection module 12 mounted on the bottom of the terminal module 11 forms a first (outer) oil collection tank 22, which incorporates a second (inner) oil collection tank 23. The outer oil collection tank 22 is connected with the cavity 14 formed by the terminal module 11 so as to carry fluid by means of the holes 24 formed in the wall on the bottom of the terminal module 11. In this regard, the cavity 14 formed by the terminal module 11, the cavity 16 formed by the filter module 10 on the outside of the filter element 19, as well as the outer oil collection tank 22 together comprise an entry area located on the inflow side ("contaminated gas side") of the filter element 19, while the cavity 20 formed on the inside of the filter element 19 gives rise to an exit area located on the outflow side ("cleaned gas side") of the filter element 19.

The holes 24 are deeper in the gravitational direction than the port 18 of the inlet opening 17, so that the oil constituents separated form the gas fuel streaming into the cavity 14 by gravitation can be discharged into the outer oil collection tank 22 via the holes 24. The inner oil collection tank 23 is joined with the cavity 20 so as to carry fluid by means of a connecting pipe 25 that extends into the cavity 20. The port 26 of the connecting pie 25 is deeper in a gravitational direction than the port 21 of the connecting pipe 13, so that oil flowing away from the filter element 19 can pass through the connecting pipe 25 and into the inner oil collection tank 23, without contaminating the cleaned gas fuel in the process.

When the filter module is assembled, the two oil collection tanks 22, 23 are only joined together via the filter element 19 in terms of flow, so as to prevent the gas flow from recessing the filter element 19 (short circuit flow).

The operation of the oil separator 1 will now be described. The gas fuel flowing into the oil separator 1 via the gas fuel line 2 with a low gas pressure (e.g., approx. 8-10 bar), first enters the cavity 14 formed by the terminal module 11, is then diverted by approximately 90° against the gravitational direction, and passes through the holes 15 to get into the cavity 16 formed by the filter module 10 on the outside of the filter element 19. Liquid oil constituents of the gas fuel are essentially separated out via gravitation in the cavity 14, and collect as an oil slick 28 at the lowest point, for example on the floor, of the outer oil collection tank 22. The separation of liquid oil constituents from the gas fuel stream is facilitated by diverting the direction of flow by approximately 90°, so that the incoming gas fuel is forced to flow against the gravitational direction. Since the oil separator 1 is arranged on the low-pressure side of the pressure reducer 3 in the gas fuel line of the combustion engine, already condensed oil constituents are easier to separate out in the gas fuel stream.

The gas fuel subsequently flows through the filter element 19, as a result of which the oil constituents contained in the gas fuel, in particular in the form of an aerosol, as trapped, and gets into the cavity 20 on the inside of the filter element 19. From there, the cleaned gas fuel is fed via the connecting pipe 13 to the gas fuel line 30, which supplies the fuel injectors 9. Once the filter element 19 is saturated, the trapped oil is transported by the present gas fuel stream to the clean gas side, meaning into the cavity 20 on the inside of the filter element 19, from where it can be discharged into the inner oil collection tank 23 via the connecting pipe 25. The oil gathers in an oil slick 28 inside the oil collection tank 23 at a deepest point (e.g., on the floor of the collection tank 23).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and/or detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. An oil separator for separating oil constituents contained in gas fuel, for connection to a gas fuel line of a gas-powered combustion engine, comprising:
    a casing with an inlet opening and an outlet opening for the gas fuel;
    a filter element incorporated in the casing, through which gas fuel can flow, which forms a seal between an entry area connected with the inlet opening in terms of flow and an exit area connected with the outlet opening;
    a first oil collection tank set up in the entry area in a gravitational direction under a port connected with the inlet opening for discharging the gas fuel into the entry area, for holding oil separated from the gas fuel in the entry area through gravitational separation; and
    a second oil collection tank adapted to collect oil coming from the filter element in the exit area, and situated in the exit area in the gravitational direction under a port connected with the outlet opening,
    wherein the filter element is contained within a filter module, the first oil collection tank is contained wholly within an oil collection module, and a terminal module contains the inlet opening and outlet opening, the filter module detachably coupled to a first side of the terminal module and the oil collection module detachably coupled to a second side of the terminal module, the first side of the terminal module opposite the second side of the terminal module.

2. The oil separator according to claim 1, wherein a gas fuel stream of the gas fuel flowing into the entry area experiences an increase in a vector flow component directed against the gravitational direction.

3. The oil separator according to claim 1, wherein the second oil collection tank is situated inside the first oil collection tank.

4. A combustion engine for powering a motor vehicle, comprising:
    a gas fuel-powered combustion engine;
    a pressure reducer for decreasing the gas pressure of the gas fuel routed to the combustion engine, which is connected in terms of flow on the high-pressure side by a gas fuel line with at least one gas tank to store gas fuel, and on the low-pressure side by a gas fuel line with at least one controllable fuel injection valve for regulating the gas flow of the gas fuel routed to the combustion engine, wherein the combustion engine further comprises an oil separator comprising:

a casing with an inlet opening and an outlet opening for the gas fuel;

a filter element incorporated in the casing, through which gas fuel can flow, which forms a seal between an entry area connected with the inlet opening in terms of flow and an exit area connected with the outlet opening;

a first oil collection tank set up in the entry area in a gravitational direction under a port connected with the inlet opening for discharging the gas fuel into the entry area, for holding oil separated from the gas fuel in the entry area through gravitational separation;

a second oil collection tank that collects oil coming from the filter element in the exit area, the second oil collection tank situated wholly inside the first oil collection tank, wherein the filter element is contained within a filter module, the first oil collection tank and second oil collection tank are contained wholly within an oil collection module, and a terminal module contains the inlet opening and outlet opening, the filter module detachably coupled to a first side of the terminal module and the oil collection module detachably coupled to a second side of the terminal module, the first side of the terminal module substantially opposite the second side of the terminal module.

5. The combustion engine arrangement according to claim 4, wherein the oil separator is arranged on the low-pressure side of the pressure reducer.

* * * * *